United States Patent [19]

Innes et al.

[11] Patent Number: 5,606,299
[45] Date of Patent: Feb. 25, 1997

[54] MODULAR SURGE SUPPRESSOR

[75] Inventors: Mark E. Innes, Asheville; Nelson R. Palmer, Arden, both of N.C.

[73] Assignee: Eaton Corporation, Cleveland, Ohio

[21] Appl. No.: 557,588

[22] Filed: Nov. 14, 1995

[51] Int. Cl.⁶ ........................................... H01H 9/02
[52] U.S. Cl. ............................ 335/202; 335/132
[58] Field of Search ........................ 335/132, 202

[56]  References Cited

U.S. PATENT DOCUMENTS

| | | |
|---|---|---|
| 1,071,279 | 8/1913 | Van Deventer . |
| 2,309,183 | 1/1943 | Gilson et al. . |
| 2,923,849 | 2/1960 | Rees . |
| 3,369,153 | 2/1968 | Arnold et al. . |
| 4,089,032 | 5/1978 | Dell Orfano . |
| 4,539,541 | 9/1985 | Bharteey et al. ............ 335/132 |
| 4,688,135 | 8/1987 | Leopold . |
| 4,760,364 | 7/1988 | Ostby . |
| 4,766,273 | 8/1988 | Butterworth et al. . |
| 4,827,369 | 5/1989 | Saletta et al. . |
| 4,963,846 | 10/1990 | Grunert et al. . |
| 4,980,801 | 12/1990 | Guinda et al. ............... 335/132 |
| 5,023,747 | 6/1991 | Lindsay . |
| 5,229,909 | 7/1993 | Tessmer et al. . |
| 5,414,587 | 5/1995 | Kiser et al. . |
| 5,483,212 | 1/1996 | Lankuttis et al. ............ 335/202 |

OTHER PUBLICATIONS

Catalog 25–000 Quick Selector 1993, Distribution & Control, Westinghouse Electrical Components Division, Feb. 1993, 2 pp.

*Primary Examiner*—Lincoln Donovan
*Attorney, Agent, or Firm*—Larry G. Vandezande

[57] ABSTRACT

An electrical switching device such as a motor starter is adapted to be controlled through control signals in control wiring and includes separable contacts; an operating mechanism for opening and closing the separable contacts; first terminals for interfacing the control signals to the operating mechanism; a modular surge suppressor circuit for suppressing a surge associated with the control signals, with the modular surge suppressor circuit including second terminals for engaging the first terminals and interfacing the control signals thereto; and a modular terminal block for interfacing the control signals in the control wiring to the modular surge suppressor circuit.

20 Claims, 6 Drawing Sheets

44

46

5,606,299

MODULAR SURGE SUPPRESSOR

BACKGROUND OF THE INVENTION

1. Field of the Invention

This invention relates to a surge suppressor and, more particularly, to a modular surge suppressor for an electrical switching device such as a motor starter.

2. Background Information

Electrical switching devices include, for example, circuit switching devices and circuit interrupters such as circuit breakers, contactors, motor starters and motor controllers. Circuit breakers, which are well-known in the art, are generally used to protect electrical circuitry from damage due to an overcurrent condition, such as an overload fault or a relatively high level short circuit condition. Molded case circuit breakers, for example, include at least one pair of separable contacts which are operated either manually by way of a handle disposed on the outside of the case or automatically by way of an internal trip unit in response to an overcurrent condition.

When the circuit breaker is on, a movable contact assembly is in contact with a stationary or fixed contact assembly. The closed contacts conduct a flow of current between a line terminal and a load terminal. When the circuit breaker trips or is switched off, the movable contact assembly is moved away from the fixed contact assembly, thus, interrupting the flow of current between the line and load terminals. Examples of molded case circuit breakers are disclosed in U.S. Pat. Nos. 4,827,369; and 4,963,846.

Additional types of circuit interrupters include, for example, contactors, motor starters, motor controllers, lighting controllers, other load controllers and other electromechanical switching devices used for controlling a variety of electrical loads. Electromagnetic contactors, for example, include a plurality of movable electrical contacts which are brought into contact with a plurality of fixed electrical contacts to close the contactor whenever the coil is energized. On the other hand, whenever the coil is de-energized, the movable electrical contacts are separated from the fixed contacts to open the contactor. Examples of contactors are disclosed in U.S. Pat. Nos. 4,760,364; and 4,766,273.

A common type of starter for loads such as motors, lighting, and the like, comprises an electromagnetic contactor with an overload relay. In a motor starter, for example, the purpose of the overload relay is to estimate the heat produced in the motor by line current and "trip" or stop the motor if the retained heat exceeds an acceptable level. The overload relay monitors the load current and trips the contactor open if a persistent overcurrent condition exists. Typically, the overload relay tracks an $I^2t$ characteristic of the load current which is a measure of heating.

Today, it is common for the overload relay to contain a microprocessor which digitally generates the $I^2t$ characteristic. When the calculated $I^2t$ value reaches a trip level, the contactor is tripped open to interrupt the flow of current to the load.

It is known that switching the coil of a contactor may cause transients. A common solution to this problem is to provide a surge suppressor having wires for attachment of a surge suppression circuit across the contactor coil. However, a user must utilize a screw driver in order to connect or disconnect the surge suppressor to or from the contactor and, hence, there is room for improvement.

SUMMARY OF THE INVENTION

The invention is directed to an electrical switching device, adapted to be controlled through control signals in control wiring, with the device including separable contacts; a mechanism for opening and closing the separable contacts; a first terminal mechanism for interfacing the control signals to the mechanism for opening and closing the separable contacts; a surge suppressor circuit for suppressing a surge associated with the control signals, with the surge suppressor circuit including a second terminal mechanism for engaging the first terminal mechanism and interfacing the control signals thereto; and a mechanism for interfacing the control signals in the control wiring to the surge suppressor circuit.

As another aspect of the invention, an electrical switching device, adapted to be controlled through control signals in control wiring, includes separable contacts; a mechanism for operating the separable contacts; a first terminal mechanism for interfacing the control signals to the mechanism for operating the separable contacts; a modular surge suppressor circuit at least for suppressing a surge associated with the control signals, with the modular surge suppressor circuit including a second terminal mechanism for engaging the first terminal mechanism and interfacing the control signals thereto, and also including a third terminal mechanism for interfacing the control signals to the second terminal mechanism; and a modular terminal block mechanism for engaging the control wiring and interfacing the control signals to the third terminal mechanism.

As a further aspect of the invention, a motor starter, which is adapted to be controlled through control signals in control wiring, includes an electrical contactor mechanism including separable contacts and an operating mechanism for opening and closing the separable contacts; an overload relay mechanism operatively associated with the electrical contactor mechanism for controlling the operating mechanism using the control signals; a first terminal mechanism for interfacing the control signals to the overload relay mechanism; a modular surge suppressor circuit at least for suppressing a surge associated with the control signals, with the modular surge suppressor circuit including a second terminal mechanism for engaging the first terminal mechanism and interfacing the control signals thereto, and also including a third terminal mechanism for interfacing the control signals to the second terminal mechanism; and a modular terminal block mechanism for engaging the control wiring and interfacing the control signals to the third terminal mechanism.

It is an object of the present invention to provide a modular surge suppressor which can be installed without hand wiring.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

As employed herein, the term "control signals" shall expressly include, but not be limited to control voltages, control currents and/or other electrical control signals.

As employed herein, the term "control wiring" shall expressly include, but not be limited to any circuit or conductor providing electrical interconnection of control signals such as, for example, insulated or non-insulated conductors, wires, cables or bus bars.

As employed herein, the term "terminal" shall expressly include, but not be limited to an electrical connection point for control wiring such as, for example, input terminals, output terminals, male terminals, female terminals, or terminals for mating or engaging other terminals.

Figure 1:
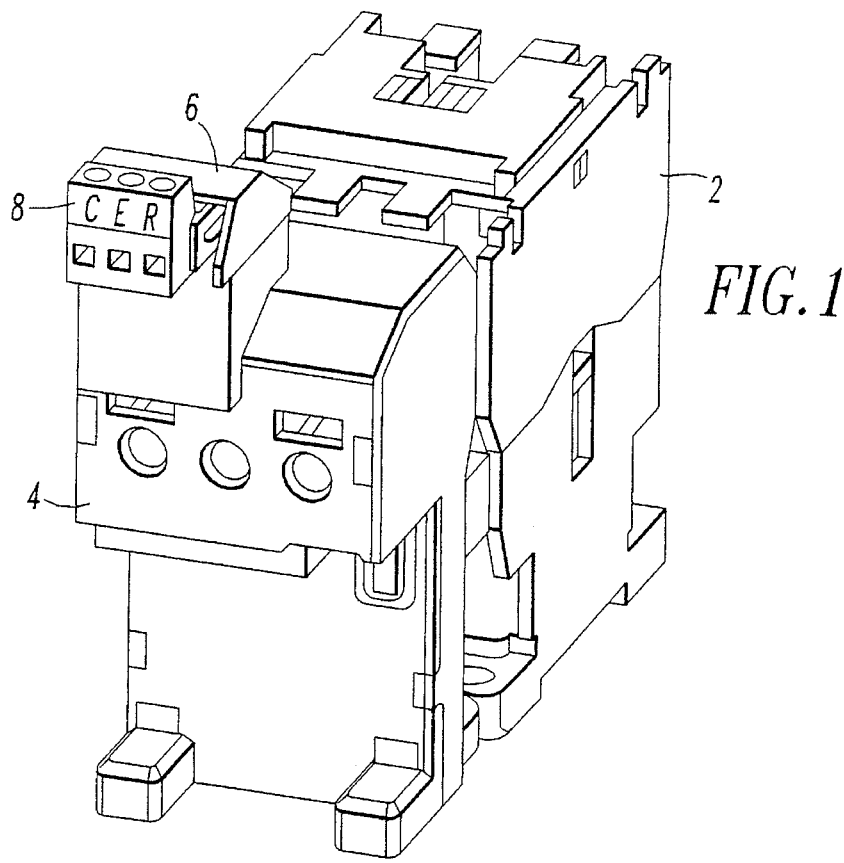
FIG. 1 is an isometric view of a modular contactor, overload relay, surge suppressor and terminal block in accordance with the invention.
Figure 2:
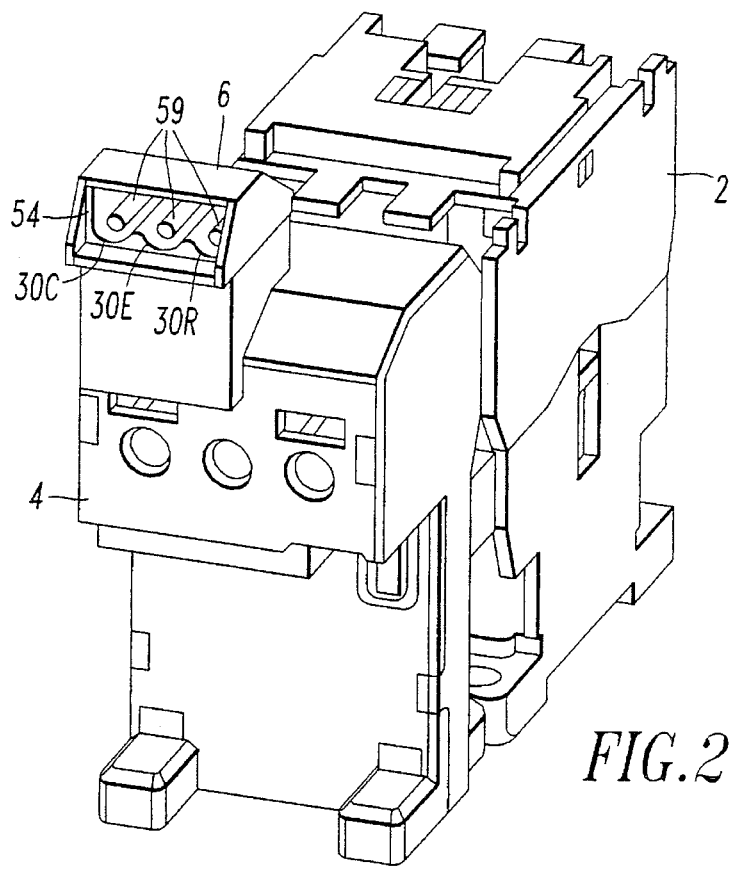
FIG. 2 is an isometric view of the modular contactor, overload relay and surge suppressor of FIG. 1.
Figure 3:
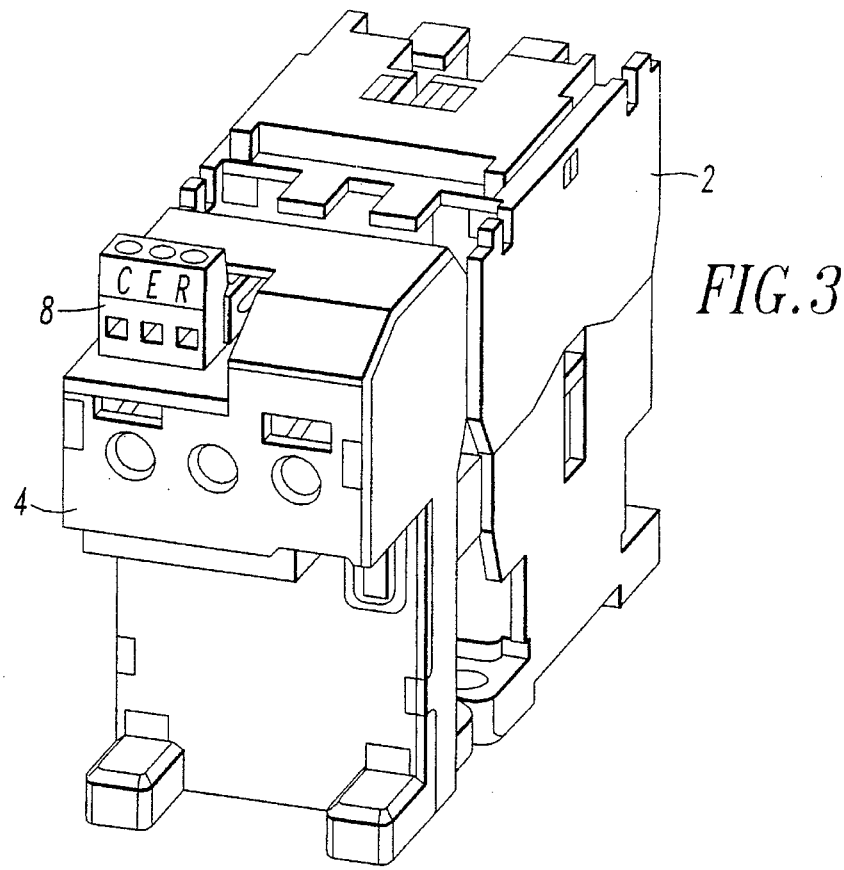
FIG. 3 is an isometric view of the modular contactor, overload relay and terminal block of FIG. 1.
Figure 4:
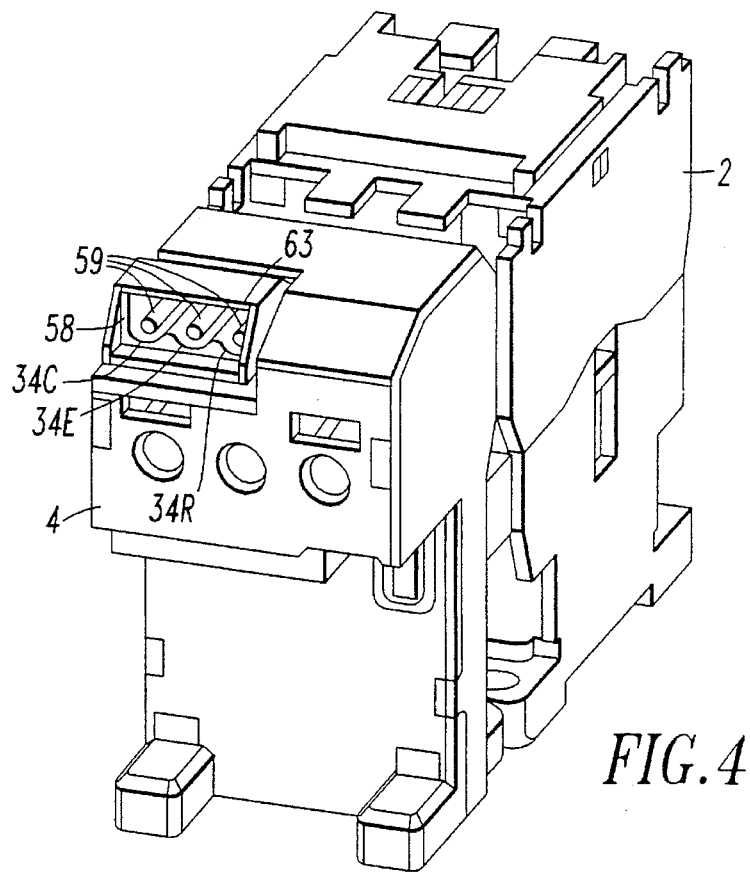
FIG. 4 is an isometric view of the modular contactor and overload relay of FIG. 1.

Referring to FIG. 1, an isometric view of a modular contactor 2, overload relay 4, surge suppressor 6 and terminal block 8 are illustrated. As shown in FIG. 1 and as explained in greater detail below with FIGS. 5–7, the terminal block 8 engages the surge suppressor 6 which, in turn, engages the overload relay 4 which, in turn, engages the contactor 2. FIG. 2 illustrates the modular contactor 2, overload relay 4 and surge suppressor 6 with the terminal block 8 of FIG. 1 removed. FIG. 3 illustrates the modular contactor 2 and overload relay 4 with the terminal block 8 engaging the overload relay 4 in place of the surge suppressor 6 of FIG. 1. FIG. 4 illustrates the modular contactor 2 and overload relay 4 with the surge suppressor 6 and terminal block 8 removed. The modular contactor 2 and overload relay 4 are disclosed in greater detail in concurrently filed, commonly assigned, copending Application Ser. No. 08/558,634, entitled "Motor Control System".

Figure 5:
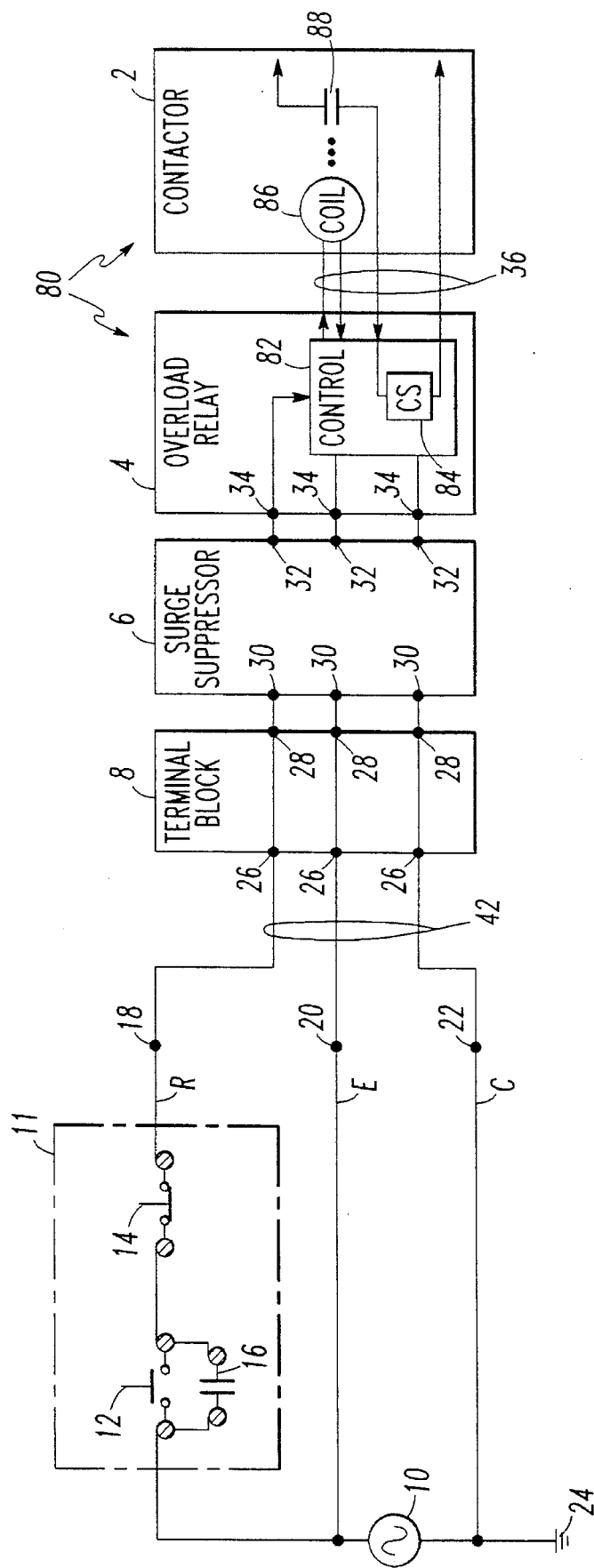
FIG. 5 is a block diagram and schematic of the interface to the terminal block and surge suppressor of FIG. 1.

Referring to FIG. 5, a block diagram and schematic of the interface to the terminal block 8 and surge suppressor 6 is illustrated. A control voltage 10 (e.g., a line voltage) is connected to two conductors 20,22. The control voltage 10 is derived by an external transformer (not shown) from the power line phases (not shown) of the contactor 2, although the present invention is applicable to any direct current or alternating current control voltage associated with one or more power line phases. A conventional motor starting circuit 11 includes a normally open start switch 12, a normally closed stop switch 14, and a normally open contact 16 which is closed in order to seal-in the start switch 12 whenever a load (not shown) such as a motor powered through the contactor 2 is energized. As understood by those skilled in the art, the circuit 11 provides a control signal R (e.g., RUN) on conductor 18, although the present invention is applicable to any direct current or alternating current control signal. Whenever the switches 12, 14 are both closed, the voltage of the control signal R is the same as the control voltage 10 and the voltage E (e.g., ENABLE) of the conductor 20. The voltage C of the return conductor 22 is a voltage common which is referenced to ground 24, although the invention is applicable to isolated control voltages. In this manner, the control signal R and the voltage E, which is the same as the control voltage 10, are both referenced to the ground 24.

The terminal block 8 includes a plurality of input terminals 26 which engage the conductors 18,20,22 and a plurality of output terminals 28 which engage a corresponding plurality of input terminals 30 of the surge suppressor 6. The surge suppressor 6 includes a plurality of output terminals 32 which engage a corresponding plurality of input terminals 34 of the overload relay 4 which, in turn, engages the contactor 2 at an interface 36. As explained in greater detail below with FIG. 11, the surge suppressor 6 conditions the voltages R,E,C and/or suppresses surge voltages or transients thereon. The modular terminal block 8 forms a mechanism for interfacing the conductors 18,20,22 with the modular surge suppressor 6, although the invention is applicable to a wide variety of other termination mechanisms for engaging control wiring such as, for example, compression terminals, screw terminals and ring lug terminals.

Figure 6:
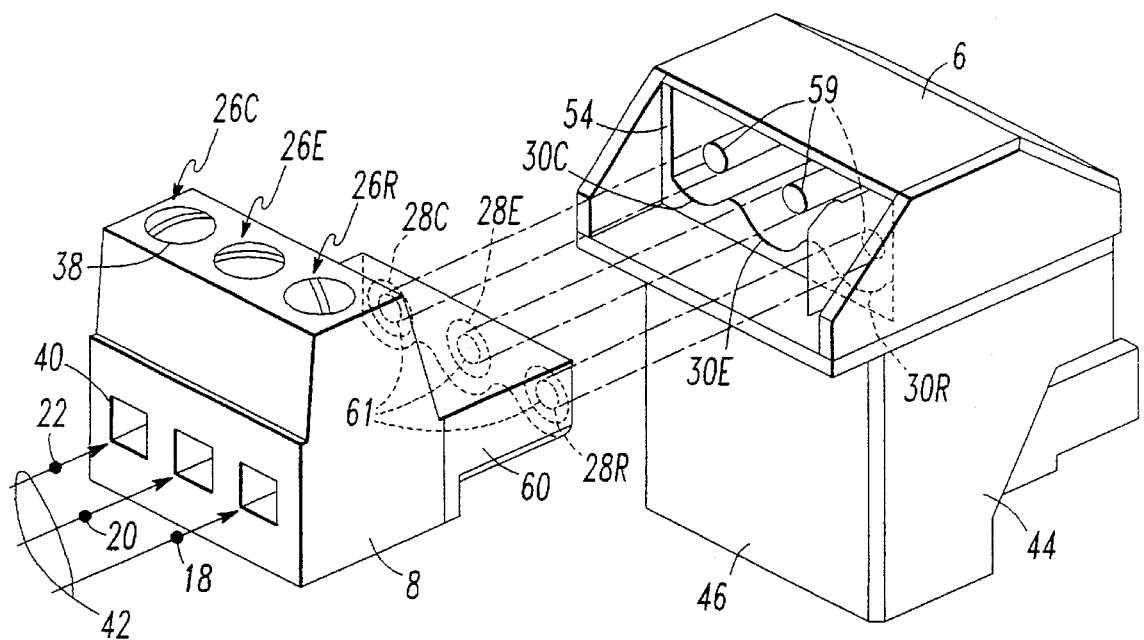
FIG. 6 is an exploded isometric view of the surge suppressor and terminal block of FIG. 1.
Figure 7:
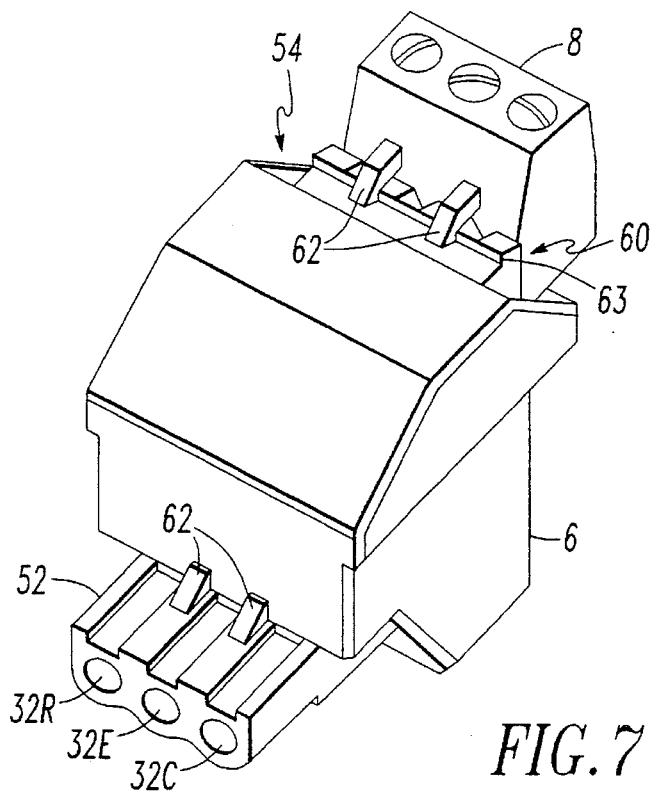
FIG. 7 is in isometric view of the surge suppressor and terminal block of FIG. 6 shown engaged.
Figure 8:
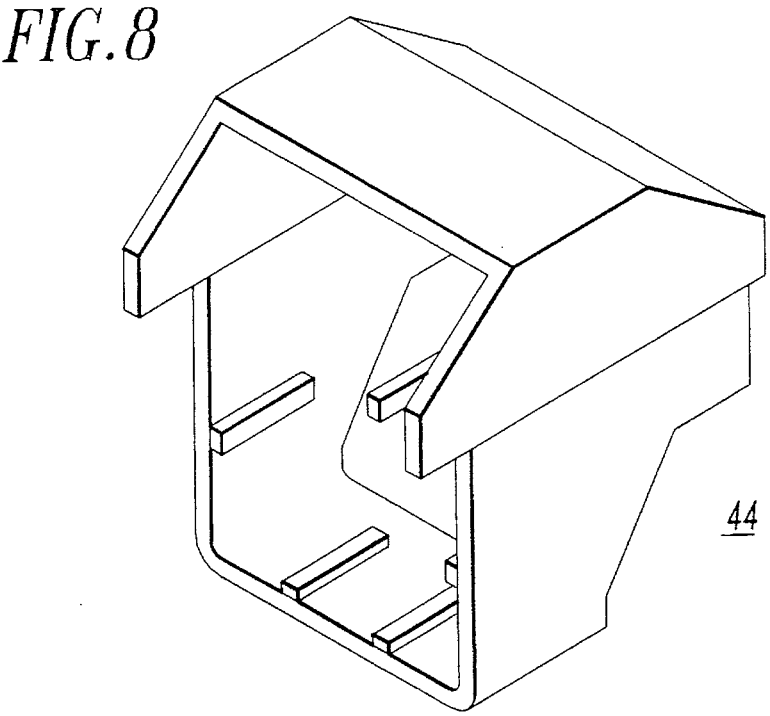
FIG. 8 is an isometric view of a cover of the surge suppressor of FIG. 1.
Figure 9:
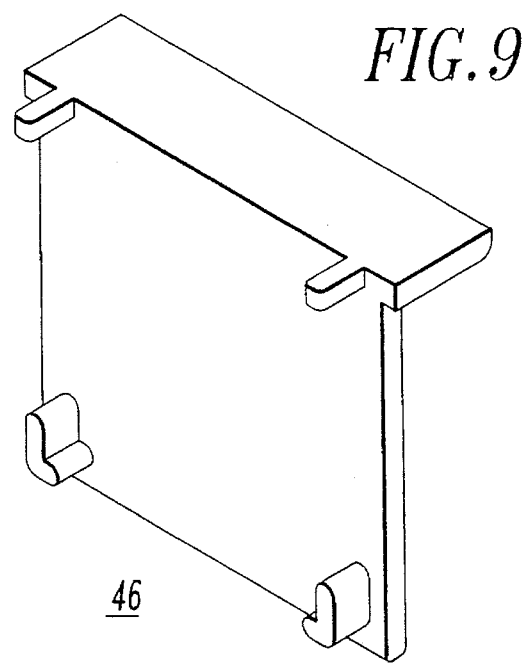
FIG. 9 is an isometric view of a base of the surge suppressor of FIG. 1.
Figure 10:
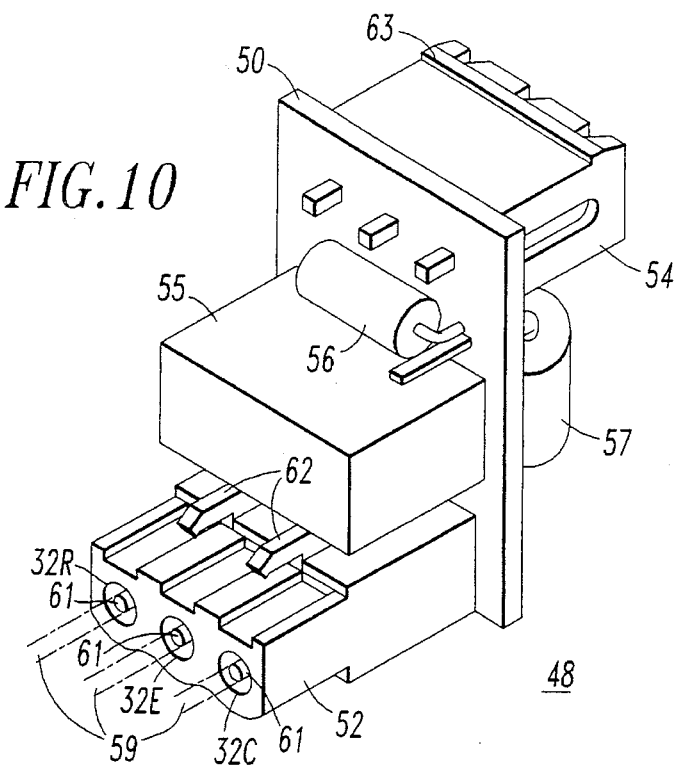
FIG. 10 is an isometric view of a printed circuit board assembly for the surge suppressor of FIG. 1.

Referring to FIGS. 6 and 7, isometric views of the surge suppressor 6 and terminal block 8 are illustrated with the terminal block 8 respectively separated from and installed into the surge suppressor 6. The terminal block 8 includes a plurality of input terminals 26R,26E,26C which engage the conductors 18,20,22, respectively. As shown with the input terminal 26C and conductor 22, each of the input terminals 26R,26E,26C includes a screw 38 for compressing a compression terminal (not shown) in a compression terminal socket 40 which engages one of the conductors 18,20,22, respectively. The screws 38 and sockets 40 form a screw terminal mechanism for engaging control wiring 42 which includes the conductors 18,20,22, although the invention is applicable to a wide variety of termination techniques for a wide range of conductive circuits. The exemplary terminal block 8 also includes a plurality of output terminals 28C, 28E,28R (shown in hidden line drawing) which engage a plurality of input terminals 30C,30E,30R, respectively, of the surge suppressor 6. The surge suppressor 6 also includes a plurality of output terminals 32C,32E,32R which respectively engage a plurality of input terminals 34C,34E,34R of the overload relay 4 of FIG. 4. As shown with FIGS. 1–4 and 6, both sets of input terminals 30C,30E,30R; 34C,34E,34R are designed to engage the output terminals 28C,28E,28R of the terminal block 8.

Referring to FIGS. 6 and 8–10, the exemplary surge suppressor 6 includes a plastic cover 44, a plastic base 46 and a printed circuit board assembly 48 which is secured between the cover 44 and base 46, although the present invention is applicable to surge suppressors having a wide variety of packages and circuit assemblies that support both input terminals for interfacing a termination mechanism and output terminals for interfacing an electrical switching device. The printed circuit board assembly 48 includes a printed circuit board 50, a male plug 52 having the output terminals 32C,32E,32R, a female header 54 having the input terminals 30C,30E,30R (shown in FIG. 6), a capacitor 55, and resistors 56,57.

As shown in FIG. 4, the input terminals 34C,34E,34R of the overload relay 4 are housed in a female header 58. The output terminals 28C,28E,28R of the terminal block 8 of FIG. 6 are housed in a male plug 60 which engages the female header 58 of the overload relay 4 or the female header 54 of the surge suppressor 6. Both of the exemplary female headers 54 and 58 have three male terminals 59 which engage corresponding female terminals 61 of the male plugs 60 and 52,60, respectively (as shown in phantom line drawing with the male plug 52 of FIG. 10).

Referring to FIGS. 4 and 7, each of the male plugs 52 and 60 have a pair of tabs 62 which engage (as shown in FIG. 7) a shoulder 63 of the female headers 58 and 54,58, respectively. In this manner, the tabs 62 and shoulder 63 provide a mechanical locking mechanism for securably engaging the output terminals 32C,32E,32R of the surge suppressor 6 to the input terminals 34C,34E,34R of the overload relay 4 by locking the male plug 52 to the female header 58 when the terminals 32C,32E,32R; 34C,34E,34R are engaged. Similarly, the tabs 62 and shoulder 63 also provide a mechanical locking mechanism for securably engaging the output terminals 28C,28E,28R of the terminal block 8 to the input terminals 30C,30E,30R of the surge suppressor 6 (e.g., FIGS. 1 and 7) or, alternatively, to the input terminals 34C,34E,34R of the overload relay 4 (e.g., FIG. 3).

Figure 11:
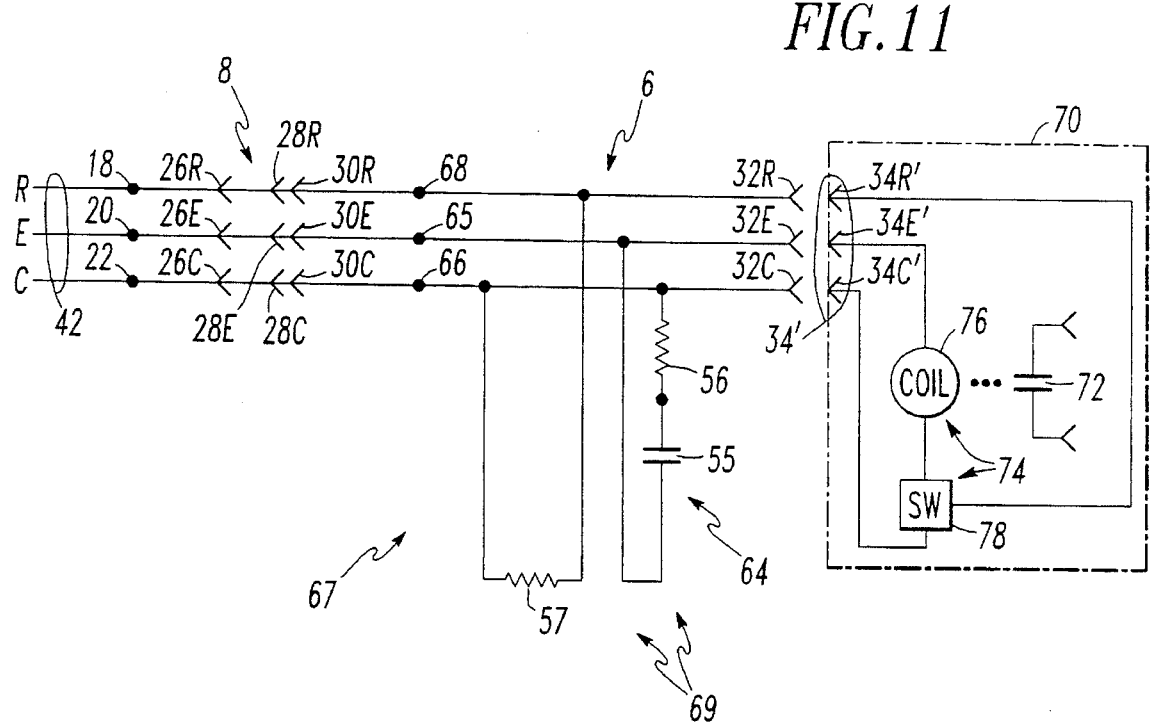
FIG. 11 is a schematic of the printed circuit board assembly of FIG. 10 and the interface to an electrical switching device.

Also referring to FIG. 11, a circuit 64 for suppressing a surge associated with the conductor 20 for the voltage E includes the series combination of the capacitor 55 and resistor 56 which form an exemplary R-C snubber circuit, although the invention is applicable to a wide variety of surge suppressors such as fuses and other current interrupting devices, current limiting devices such as resistors, inductors or positive temperature coefficient (PTC) resistive elements, varistors, zener diodes, low-pass filters, band-pass filters and other surge suppressing or voltage conditioning devices and/or circuits. The circuit 64 is electrically in parallel with the control voltage 10 of FIG. 5. The control voltage 10 is interconnected with the circuit 64 by the conductors 20,22, input terminals 26E,26C, output terminals 28E,28C, input terminals 30E,30C and printed circuit conductors 65,66, respectively. The printed circuit conductors 65 and 66 include the control signals E and C, respectively.

A circuit 67 for biasing the control signal R on printed circuit conductor 68 includes the resistor 57 which is electrically interconnected between the printed circuit conductors 68,66, the input terminals 30R,30C and the conductors 18,22, respectively. In this manner, the control signal R, as output by the output terminal 32R, is biased by the resistor 57 to the control signal C. In this manner, the impedance between the conductors 66,68 is lowered and, thus, the susceptibility of the control signal R to noise and/or surge waveforms is reduced, although the invention is applicable to other biasing techniques such as a resistor between a voltage signal and a control signal.

As shown in FIG. 11, an exemplary surge suppressor circuit 69, formed by the circuits 64,67, suppresses a surge associated with the control signal E and, also, biases the control signal R of the control wiring 42. The circuit 69 is interfaced by the output terminals 32R,32E,32C to an electrical switching device 70 such as the exemplary contactor, although the invention is applicable to a wide variety of electrical switching devices and circuit interrupters such as, for example, a circuit breaker, contactor or motor starting contactor such as the contactor 2 and overload relay 4 of FIGS. 1–4.

The exemplary electrical switching device 70, which is adapted to be controlled through the control signals R,E,C in the control wiring 42, includes separable contacts 72 and an operating mechanism 74 for operating the separable contacts 72. The exemplary operating mechanism 74 includes a coil 76 and a switch (SW) 78 which is controlled by the control signal R. When the control signal R is active, the switch 78 is turned on and the coil 76 is energized by the control voltage between the control signals E and C. In turn, the coil 76 closes the separable contacts 72 as understood by those skilled in the art. On the other hand, when the control signal R is inactive, the switch 78 is turned off, the coil 76 is de-energized and the separable contacts 72 are open. The electrical switching device 70 also includes an electrical connection mechanism 34' having input terminals 34R',34E', 34C', such as the input terminals 34R,34E,34C of the female header 58 of FIG. 4, for interfacing the respective control signals R,E,C in the control wiring 42 to the operating mechanism 74.

As discussed above with FIG. 5, the surge suppressor 6 may, alternatively, interface a motor starter 80 formed by the contactor 2 and overload relay 4. The overload relay 4 includes a control circuit 82 having a current sensor (CS) 84. The contactor 2 includes a coil 86 for controlling separable contacts 88. The overload relay control circuit 82 is operatively associated with the electrical contactor 2 through the interface 36 and controls the coil 86. The coil 86 forms an operating mechanism for opening and closing the separable contacts 88. The current sensor 84, such as a current transformer or other current sensing device, monitors the current flowing through the separable contacts 88. In this embodiment of the invention, the control signals R,E,C in the control wiring 42 are received by the control circuit 82 which, in turn, controls the contactor coil 86 using the control signal R. The control circuit 82 also provides power to the contactor coil 86 using the control signals E,C in the control wiring 42.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electrical switching device adapted to be controlled through control signals in control wiring, said device comprising:

separable contacts;

means for opening and closing said separable contacts;

first terminal means for interfacing said control signals to said means for opening and closing said separable contacts;

surge suppressor means for suppressing a surge associated with said control signals, said surge suppressor means including second terminal means for engaging said first terminal means and interfacing said control signals thereto; and means for interfacing said control signals in said control wiring to said surge suppressor means.

2. The electrical switching device as recited in claim 1 wherein said surge suppressor means includes third terminal means; and wherein said means for interfacing said control signals in said control wiring to said surge suppressor means includes fourth terminal means for engaging the third terminal means and, alternatively, for engaging said first terminal means.

3. The electrical switching device as recited in claim 2 wherein said first terminal means, the second terminal means, the third terminal means and the fourth terminal means respectively include a plurality of first terminals, a plurality of second terminals, a plurality of third terminals and a plurality of fourth terminals; wherein the second terminal means of said surge suppressor means includes first locking means for locking said first terminal means when the second terminals and the first terminals are engaged; and wherein said means for interfacing said control signals in said control wiring to said surge suppressor means includes second locking means for locking said surge suppressor means when the fourth terminals and the third terminals are engaged and, alternatively, for locking said first terminal means when the fourth terminals and the first terminals are engaged.

4. The electrical switching device as recited in claim 1 wherein said means for interfacing said control signals in said control wiring to said surge suppressor means includes terminal block means having screw terminal means for engaging said control wiring.

5. The electrical switching device as recited in claim 1 wherein said control wiring includes a conductor for a control voltage; and wherein said surge suppressor means includes means for suppressing a surge associated with the conductor for the control voltage.

6. An electrical switching device adapted to be controlled through control signals in control wiring, said device comprising:
   separable contacts;
   means for operating said separable contacts;
   first terminal means for interfacing said control signals to said means for operating said separable contacts;
   modular surge suppressor means at least for suppressing a surge associated with said control signals, said modular surge suppressor means including second terminal means for engaging said first terminal means and interfacing said control signals thereto, and also including third terminal means for interfacing said control signals to the second terminal means; and
   modular terminal block means for engaging said control wiring and interfacing said control signals to the third terminal means.

7. The electrical switching device as recited in claim 6 wherein said control wiring includes a conductor for a control voltage; and wherein said modular surge suppressor means includes means for suppressing a surge associated with the conductor for the control voltage.

8. The electrical switching device as recited in claim 7 wherein the means for suppressing the surge associated with the conductor for the control voltage includes an R-C snubber.

9. The electrical switching device as recited in claim 6 wherein said control wiring includes a conductor for a control signal; and wherein said modular surge suppressor means includes means for biasing the control signal.

10. The electrical switching device as recited in claim 9 wherein said control wiring includes a conductor for a control voltage; and wherein the means for biasing the control signal includes a resistor electrically interconnected between the conductor for the control voltage and the conductor for the control signal.

11. The electrical switching device as recited in claim 9 wherein said control wiring includes a conductor for a control voltage and a conductor for a voltage common; and wherein the resistor is electrically interconnected between the conductor for the voltage common and the conductor for the control signal.

12. The electrical switching device as recited in claim 6 wherein said first and second terminal means collectively include a plurality of male terminals and a plurality of female terminals, the male terminals for engaging the female terminals.

13. The electrical switching device as recited in claim 6 wherein said modular terminal block means includes fourth terminal means for engaging the third terminal means and, alternatively, for engaging said first terminal means.

14. The electrical switching device as recited in claim 6 wherein said modular terminal block means includes screw terminal means for engaging said control wiring.

15. A motor starter adapted to be controlled through control signals in control wiring, said motor starter comprising:
   electrical contactor means including separable contacts and operating means for opening and closing said separable contacts;
   overload relay means operatively associated with said electrical contactor means for controlling said operating means using said control signals;
   first terminal means for interfacing said control signals to said overload relay means;
   modular surge suppressor means at least for suppressing a surge associated with said control signals, said modular surge suppressor means including second terminal means for engaging said first terminal means and interfacing said control signals thereto, and also including third terminal means for interfacing said control signals to the second terminal means; and
   modular terminal block means for engaging said control wiring and interfacing said control signals to the third terminal means.

16. The motor starter as recited in claim 15 wherein said electrical contactor means further includes a coil for controlling said separable contacts; wherein said control wiring includes a conductor for a control voltage which powers the coil; and wherein said modular surge suppressor means includes means for suppressing a surge associated with the conductor for the control voltage.

17. The motor starter as recited in claim 16 wherein said control wiring includes a conductor for a control voltage and a conductor for a voltage common; and wherein the means for suppressing the surge associated with the conductor for the control voltage includes an R-C snubber which is electrically in parallel with the conductor for the control voltage and the conductor for the voltage common.

18. The motor starter as recited in claim 15 wherein said electrical contactor means further includes a coil for controlling said separable contacts; wherein said control wiring includes a conductor for a control signal for the coil; and wherein said modular surge suppressor means includes means for biasing the control signal.

19. The motor starter as recited in claim 18 wherein said control wiring includes a conductor for a control voltage which powers the coil and a conductor for a voltage common; and wherein the means for biasing the control signal includes a resistor electrically interconnected between the conductor for the voltage common and the conductor for the control signal.

20. The motor starter as recited in claim 15 wherein said modular terminal block means includes fourth terminal means for engaging the third terminal means and, alternatively, for engaging said first terminal means.

\* \* \* \* \*